US012634043B2

(12) United States Patent
Yoshioka et al.

(10) Patent No.: US 12,634,043 B2
(45) Date of Patent: May 19, 2026

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 437 days.

(21) Appl. No.: 17/796,046

(22) PCT Filed: Feb. 21, 2020

(86) PCT No.: PCT/JP2020/007186
§ 371 (c)(1),
(2) Date: Jul. 28, 2022

(87) PCT Pub. No.: WO2021/166240
PCT Pub. Date: Aug. 26, 2021

(65) Prior Publication Data
US 2023/0069228 A1 Mar. 2, 2023

(51) Int. Cl.
*H04L 1/16* (2023.01)
*H04L 1/1607* (2023.01)
*H04L 1/1812* (2023.01)

(52) U.S. Cl.
CPC .......... *H04L 1/1607* (2013.01); *H04L 1/1812* (2013.01)

(58) Field of Classification Search
CPC ................. H04L 1/1607; H04L 1/1812; H04L 1/1854; H04L 1/1861; H04L 1/1864; H04W 76/14; H04W 92/18
See application file for complete search history.

(56) References Cited

U.S. PATENT DOCUMENTS

2017/0347394 A1   11/2017   Yasukawa et al.
2020/0383105 A1*  12/2020   Park ..................... H04L 1/1671
(Continued)

FOREIGN PATENT DOCUMENTS

EP          3592023 A1      1/2020
JP        2023-501970 A     1/2023
(Continued)

OTHER PUBLICATIONS

Office Action issued in counterpart Japanese Patent Application No. 2022-501570 mailed on Feb. 27, 2024 (6 pages).
(Continued)

*Primary Examiner* — Steven Hieu D Nguyen
(74) *Attorney, Agent, or Firm* — Osha Bergman Watanabe & Burton LLP

(57) ABSTRACT

A terminal includes a receiving unit configured to receive data from another terminal, a control unit configured to set: a first parameter which determines a group hopping; or a second parameter which determines a sequence hopping, the group hopping or the sequence hopping being applied to a channel used for transmitting and receiving a response associated with a retransmission control, and a transmitting unit configured to transmit the response associated with the retransmission control corresponding to the data to the another terminal via the channel to which the group hopping or the sequence hopping is applied, wherein the first parameter and the second parameter are set for a terminal-to-terminal direct communication.

5 Claims, 10 Drawing Sheets

S101: resource selection

S102: PSCCH
S103: PSSCH

S104: HARQ-ACK on PSFCH

20A

20B

S105: HARQ retransmission

(56) References Cited

U.S. PATENT DOCUMENTS

| | | | | | |
|---|---|---|---|---|---|
| 2021/0344460 | A1* | 11/2021 | Park | | H04W 4/40 |
| 2022/0070907 | A1* | 3/2022 | Hofström | | H04W 72/21 |
| 2022/0217696 | A1* | 7/2022 | Zhao | | H04L 5/0051 |
| 2022/0248414 | A1* | 8/2022 | Deng | | H04W 4/08 |
| 2022/0304031 | A1* | 9/2022 | Hong | | H04W 72/20 |
| 2022/0393819 | A1* | 12/2022 | Lee | | H04L 5/0094 |
| 2022/0400467 | A1* | 12/2022 | Liu | | H04L 5/0037 |

FOREIGN PATENT DOCUMENTS

| | | |
|---|---|---|
| WO | 2020/033089 A1 | 2/2020 |
| WO | 2021/086163 A | 5/2021 |

OTHER PUBLICATIONS

LG Electronics; "Discussion on physical layer structure for NR sidelink"; 3GPP TSG RAN WG1 #98bis, R1-1911346; Chongqing, China; Oct. 14-20, 2019 (7 pages).

3GPP TS 38.211 V15.7.0; "3rd Generation Partnership Project; Technical Specification Group Radio Access Network; NR; Physical channels and modulation (Release 15)"; Sep. 2019 (5 pages).

Extended European Search Report issued in counterpart European Patent Application No. 20920462.7, mailed on Oct. 23, 2023 (7 pages).

Office Action issued in Japanese Application No. 2022-501570, mailed Jul. 23, 2024 (8 pages).

3GPP TSG RAN WG1 Meeting #95; R1-1814265; LG Electronics; "Updated feature lead summary for agenda item 7.2.4.1.2 Physical layer procedures"; Spokane, USA, Nov. 12-16, 2018 (13 pages).

3GPP TSG RAN WG1 #100-e; R1-2000697; ITRI; "Remaining Issues on Physical Layer Procedures in NR Sidelink"; e-Meeting, Feb. 24-Mar. 6, 2020 (6 pages).

3GPP TSG-RAN WG4 Meeting #94-e; R4-2001030; MediaTek Inc.; "Discussion on NR V2X unicast, groupcast related requirement"; Electronic Meeting, Feb. 24-Mar. 6, 2020 (5 pages).

International Search Report issued in PCT/JP2020/007186 on Sep. 29, 2020 (5 pages).

Written Opinion of the International Searching Authority issued in PCT/JP2020/007186 on Sep. 29, 2020 (3 pages).

Intel Corporation; "Sidelink physical structure for NR V2X communication"; 3GPP TSG RAN WG1 Meeting #99, R1-1913255; Reno, Nevada, USA; Nov. 18-22, 2019 (36 pages).

3GPP TS 38.211 V16.0.0; "3rd Generation Partnership Project; Technical Specification Group Radio Access Network; NR; Physical channels and modulation (Release 16)"; Dec. 2019 (129 pages).

3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).

Office Action issued in Japanese Patent Application No. 2022-501570, dated Dec. 3, 2024 (7 pages).

Office Action issued in Chinese Application No. 202080096482.9, mailed Dec. 24, 2024 (16 pages).

Office Action issued in Chinese Patent Application No. 202080096482.9, mailed Jul. 16, 2025 (14 pages).

3GPP TS 38.211 V15.8.0; "3rd Generation Partnership Project; Technical Specification Group Radio Access Network; NR; Physical channels and modulation (Release 15)"; Dec. 2019 (98 pages).

Office Action issued in Chinese Patent Application No. 202080096482.9, mailed on Feb. 5, 2026 (21 pages).

* cited by examiner

0. RRC-config. of
   configured-grant

1. PSSCH 20A                    20B

1. PSCCH

2. PSSCH 20A                    20B

TERMINAL AND COMMUNICATION METHOD

TECHNICAL FIELD

The present invention relates to a terminal a communication method for wireless communication system.

BACKGROUND ART

In the LTE (Long Term Evolution), and LTE successor systems (for example, LTE-A (LTE Advanced), and NR (New Radio) (also referred to as 5G)), the D2D (Device-to-Device) technology in which terminals communicate directly with each other without via a base station is under consideration (for example, Non-Patent Document 1).

The D2D reduces a traffic between the terminal and the base station, and enables the communication between the terminals even when the base station is unable to communicate in the event of a disaster or the like. Although the 3GPP (3rd Generation Partnership Project) refers to the D2D as the "sidelink", the more generally term D2D is used in this specification. However, in the description of the following embodiments, the term sidelink is also used as appropriate.

The D2D communication is broadly classified into a D2D discovery (discovery of D2D) for discovering other terminals capable of performing the communication, and a D2D communication (also referred to as a D2D direct communication, the D2D communication, a terminal-to-terminal direct communication, or the like) for communicating directly between the terminals. In the following description, when the D2D communication, the D2D discovery, or the like are not distinguished from one another, the D2D communication, the D2D discovery, or the like will simply be referred to as the D2D. A signal that is transmitted and received by the D2D will be referred to as a D2D signal. Various cases of use of V2X (Vehicle-to-Everything) services in the NR have been studied (for example, Non-Patent Document 2).

PRIOR ART DOCUMENTS

Non-Patent Documents

Non-Patent Document 1: 3GPP TS 38.211 V16.0.0 (2019-12)
Non-Patent Document 2: 3GPP TR 22.886 V15.1.0 (2017-03)

DISCLOSURE OF THE INVENTION

Problem to be Solved by the Invention

The terminal-to-terminal direct communication in the NR-V2X supports a HARQ (Hybrid Automatic Repeat reQuest) response in a sidelink. However, because the details of the configuration related to the format of a PSFCH (Physical Sidelink Feedback Channel), which transmits the HARQ response, are shared with a PUCCH (Physical Uplink Control Channel), transmission and reception of the HARQ response via the PSFCH having the format assuming the sidelink has not yet been realized.

The present invention has been made in view of the above noted points, and one object of the present invention is to transmit and receive the HARQ (Hybrid Automatic Repeat reQuest) response in the terminal-to-terminal direct communication, using a format for direct terminal-to-terminal communication.

Means of Solving the Problem

According to the disclosed technique, there is provided a terminal including a receiving unit configured to receive data from another terminal; a control unit configured to set a first parameter which determines a group hopping, or a second parameter which determines a sequence hopping, the group hopping or the sequence hopping being applied to a channel used for transmitting and receiving a response associated with a retransmission control; and a transmitting unit configured to transmit the response associated with the retransmission control corresponding to the data to the another terminal via the channel to which the group hopping or the sequence hopping is applied, wherein the first parameter and the second parameter are set for a terminal-to-terminal direct communication.

Effects of the Invention

According to the disclosed technique, it is possible to transmit and receive the HARQ (Hybrid Automatic Repeat reQuest) response in the terminal-to-terminal direct communication, using a format for direct terminal-to-terminal communication.

MODE OF CARRYING OUT THE INVENTION

Figure 1:
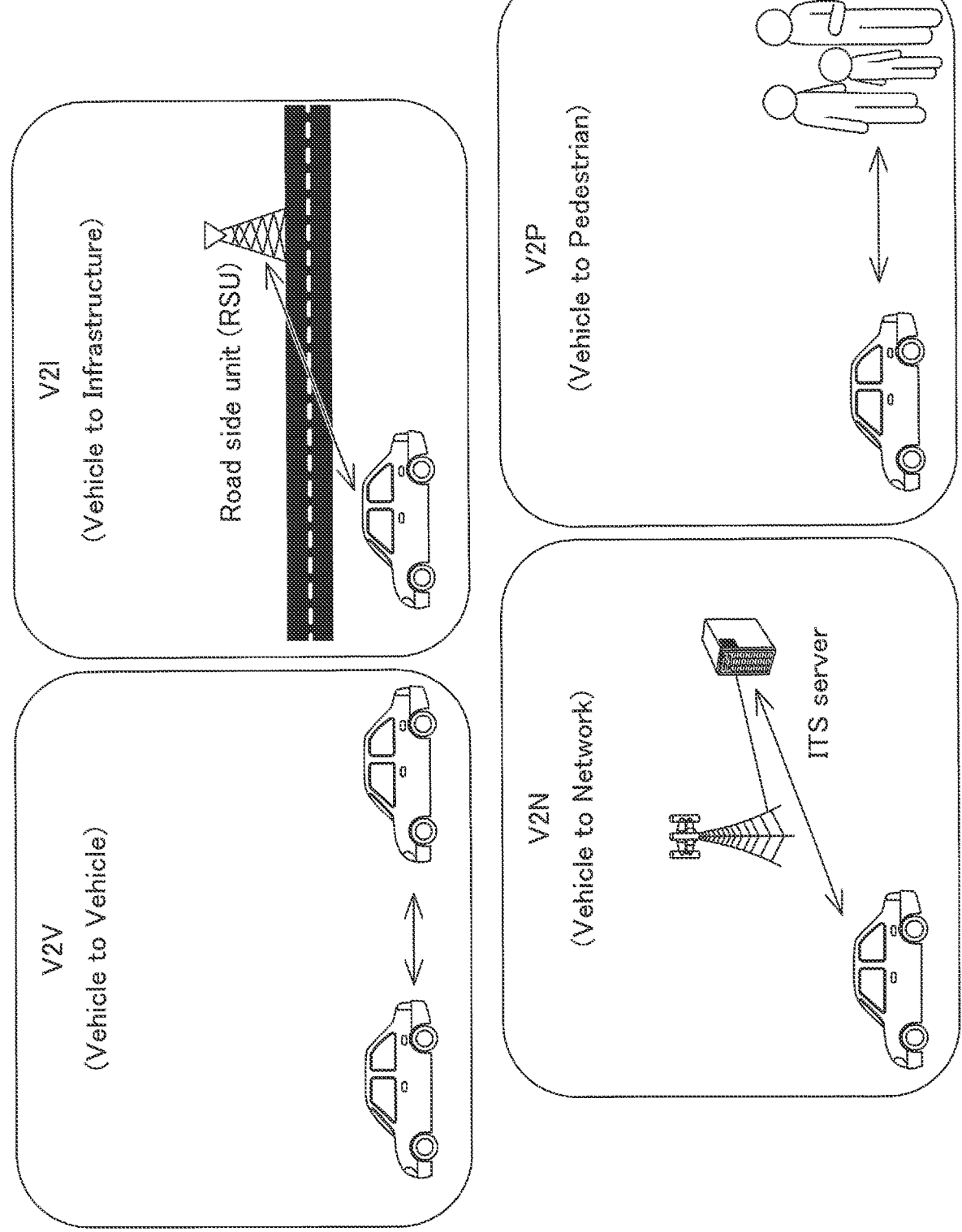
FIG. 1 is a diagram illustrating V2X.

A description will hereinafter be given of embodiments of the present invention by referring to the drawings. The embodiments described in the following are merely examples, and the embodiments to which the present invention may be applied are not limited to the following embodiments.

During operation of a wireless communication system according to one embodiment of the present invention, conventional techniques may be used, as appropriate. The conventional technique may be the conventional LTE, for example, but the conventional technique is not limited to the conventional LTE. In addition, the term "LTE" as used herein shall also have a broad meaning including the LTE-Advanced, and LTE-Advanced successor systems (for example, the NR), or wireless LAN (Local Area Network), unless otherwise indicated.

In addition, in an embodiment of the invention, a duplexing scheme may be Time Division Duplexing (TDD), may be Frequency Division Duplexing (FDD), or may be other schemes (for example, Flexible Duplexing or the like)".

Further, in the embodiments of the present invention, to "configure (set)" or "define" a wireless parameter or the like may refer to preset (pre-configure) a predetermined value, or to configure the wireless parameter indicated by a base station 10 or a terminal 20.

FIG. 1 is a diagram illustrating a V2X. In the 3GPP, discussions are being made to extend the D2D function in order to implement a V2X (Vehicle to Everything) or an eV2X (enhanced V2X) and technical specifications are being developed. As illustrated in FIG. 1, the V2X is a part of ITS (Intelligent Transport Systems), and is a generic name for V2V (Vehicle-to-Vehicle) which refers to a communication format between vehicles, V2I (Vehicle-to-Infrastructure) which refers to a communication format between a vehicle and a RSU (Road-Side Unit) installed on a road-side, V2N (Vehicle-to-Network) which refers to a communication format between the vehicle and an ITS server, and V2P (Vehicle-to-Pedestrian) which refers to a communication format between the vehicle and a mobile terminal carried by a pedestrian.

In addition, in the 3GPP, there are studies on the V2X using the LTE or NR cellular communication and terminal-to-terminal communication. The V2X using the cellular communication is also referred to as a cellular V2X. In the V2X using the NR, there are studies to realize a large capacity, a low delay, a high reliability, and QoS (Quality of Service) control.

It may be anticipated that studies will be made in the future on the V2X using the LTE or NR, not limited to the 3GPP specifications. For example, it may be anticipated that studies will be made on securing interoperability, reducing the cost by a higher layer implementation, methods of combining or switching a plurality of RATs (Radio Access Technologies), complying with regulations in each country, and acquiring, distributing, managing database, and methods of utilizing data on the LTE or NR V2X platforms.

In the embodiments of the present invention, it is mainly assumed that a communication device is mounted on a vehicle, but the embodiments of the present invention are not limited to such embodiments. For example, the communication device may be a terminal carried by a person, or the communication device may be a device mounted on a drone or an aircraft, or the communication device may be a base station, an RSU, a relay station (relay node), a terminal having scheduling capabilities, or the like.

A SL (SideLink) may be distinguished from an UL (UpLink) or a DL (DownLink), based on one of the following 1)-4), or a combination thereof. In addition, the SL may be referred to by another name.

1) Resource allocation in a time domain
2) Resource allocation in a frequency domain
3) Synchronization signal (including SLSS (SideLink Synchronization Signal) to be referenced)
4) Reference signal used in path loss measurement for transmission power control Further, any one of CP-OFDM (Cyclic-Prefix OFDM), DFT-S-OFDM (Discrete Fourier Transform-Spread-OFDM), OFDM without Transform precoding, and OFDM with Transform precoding may be applied with respect to the SL or UL OFDM (Orthogonal Frequency Division Multiplexing). Moreover, the SL may be implemented under a multicarrier environment.

In the SL of the LTE, Mode3 and Mode4 are defined with respect to the SL resource allocation to the terminal 20. In Mode3, a transmission resource is dynamically allocated by DCI (Downlink Control Information) transmitted from the base station 10 to the terminal 20. SPS (Semi Persistent Scheduling) is also possible in Mode3. In Mode4, the terminal 20 autonomously selects the transmission resource from a resource pool.

A slot in the embodiments of the present invention may be referred to by other terms including a symbol, a minislot, a subframe, a wireless frame, and a TTI (Transmission Time Interval). In addition, a cell in the embodiments of the present invention may be referred to by other terms including a cell group, a carrier component, a BWP, a resource pool, a resource, a RAT (Radio Access Technology), a system (including wireless LAN), or the like.

Figure 2:
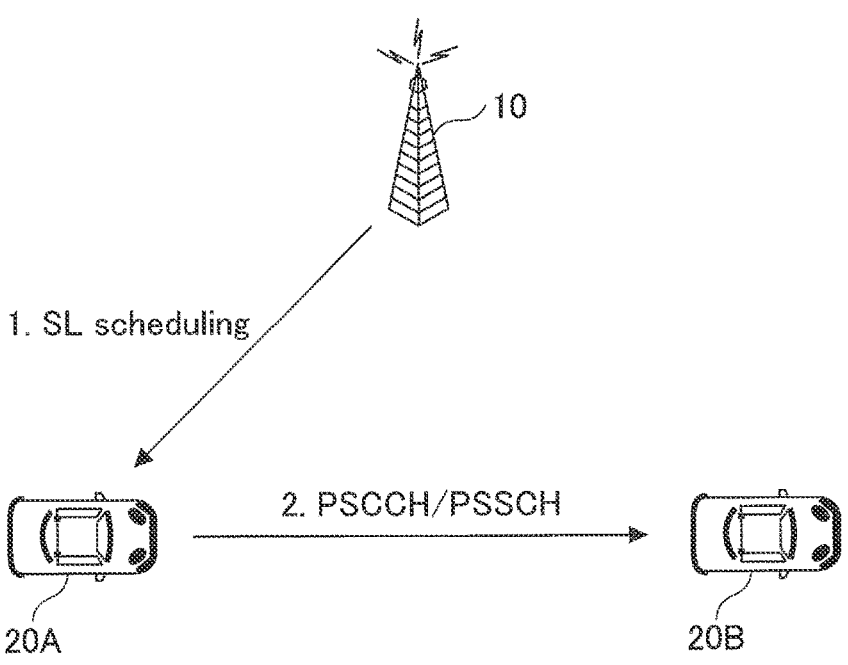
FIG. 2 is a diagram illustrating an example (1) of a transmission mode of the V2X.

FIG. 2 is a diagram illustrating an example (1) of a transmission mode of V2X. In a transmission mode of a sidelink communication illustrated in FIG. 2, the base station 10 transmits the sidelink scheduling to a terminal 20A, in step 1. Next, the terminal 20A transmits a PSCCH (Physical Sidelink Control CHannel) and a PSSCH (Physical Sidelink Shared CHannel) to a terminal 20B, based on the received scheduling (step 2). The transmission mode of the sidelink communication illustrated in FIG. 2 may be referred to as a sidelink transmission mode 3 of the LTE. In the sidelink transmission mode 3 of the LTE, a Uu-based sidelink scheduling is performed. The Uu is a wireless interface between a UTRAN (Universal Terrestrial Radio Access Network) and a UE (User Equipment). The transmission mode of the sidelink communication illustrated in FIG. 2 may be referred to as a sidelink transmission mode 1 of the NR.

Figure 3:
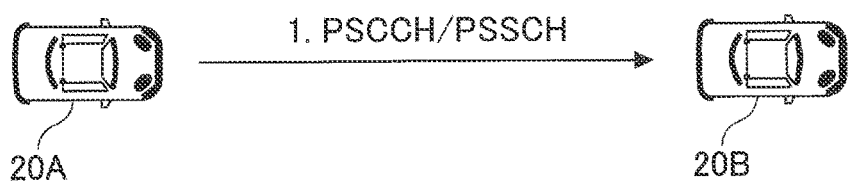
FIG. 3 is a diagram illustrating an example (2) of the transmission mode of the V2X.

FIG. 3 is a diagram illustrating an example (2) of the transmission mode of the V2X. In the transmission mode of the sidelink communication illustrated in FIG. 3, the terminal 20A transmits the PSCCH and the PSSCH to the terminal 20B using an autonomously selected resource, in step 1. The transmission mode of the sidelink communication illustrated in FIG. 3 may be referred to as a sidelink transmission mode 4 of the LTE. In the sidelink transmission mode 4 of the LTE, the UE itself performs the resource selection.

Figure 4:
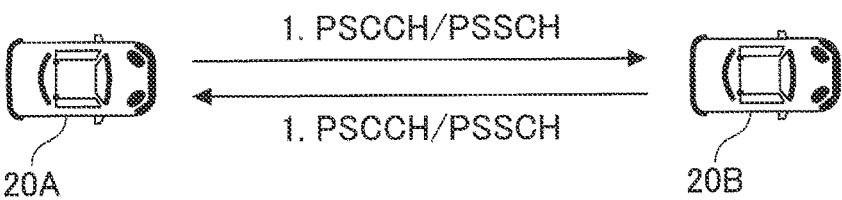
FIG. 4 is a diagram illustrating an example (3) of the transmission mode of the V2X.

FIG. 4 is a diagram illustrating an example (3) of the transmission mode of the V2X. In the transmission mode of the sidelink communication illustrated in FIG. 4, the terminal 20A transmits the PSCCH and the PSSCH to the terminal 20B using an autonomously selected resource, in step 1. Similarly, the terminal 20B transmits a PSCCH and a PSSCH to the terminal 20A using an autonomously selected resource (step 1). The transmission mode of the sidelink communication illustrated in FIG. 4 may be referred to as a sidelink transmission mode 2*a* of the NR. In the sidelink transmission mode 2 of the NR, the terminal 20 itself performs the resource selection.

Figure 5:
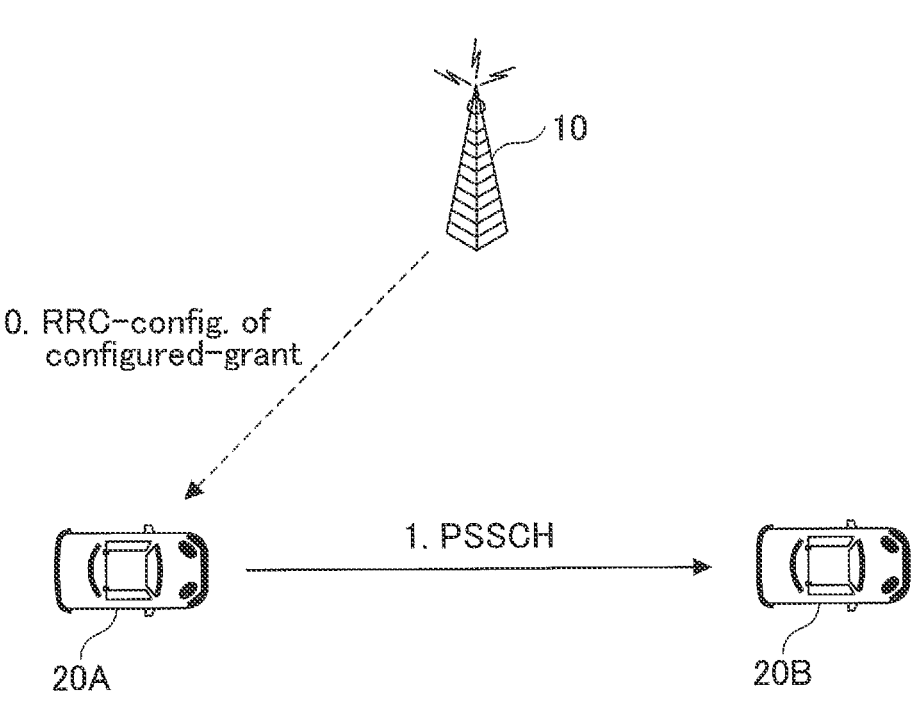
FIG. 5 is a diagram illustrating an example (4) of the transmission mode of the V2X.

FIG. 5 is a diagram illustrating an example (4) of the transmission mode of the V2X. In the transmission mode of the sidelink communication illustrated in FIG. 5, the base station 10 transmits a sidelink grant to the terminal 20A via a RRC (Radio Resource Control) configuration, in step 0. Next, the terminal 20A transmits the PSSCH to the terminal 20B, based on the received resource pattern (step 1). The transmission mode of the sidelink communication illustrated in FIG. 5 may be referred to as a sidelink transmission mode 2*c* of the NR.

Figure 6:
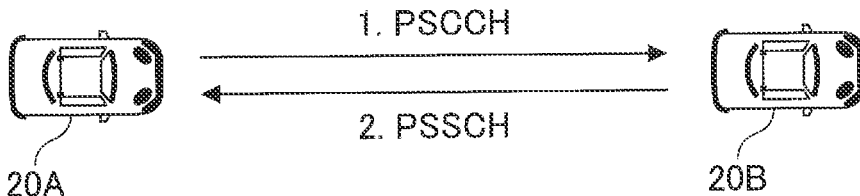
FIG. 6 is a diagram illustrating an example (5) of the transmission mode of the V2X.

FIG. 6 is a diagram illustrating an example (5) of the transmission mode of the V2X. In the transmission mode of the sidelink communication illustrated in FIG. 6, the terminal 20A transmits the sidelink scheduling to the terminal 20B via the PSCCH, in step 1. Next, the terminal 20B transmits the PSSCH to the terminal 20A based on the received scheduling (step 2). The transmission mode of the sidelink communication illustrated in FIG. 6 may be referred to as a sidelink transmission mode 2*d* of the NR.

Figure 7:
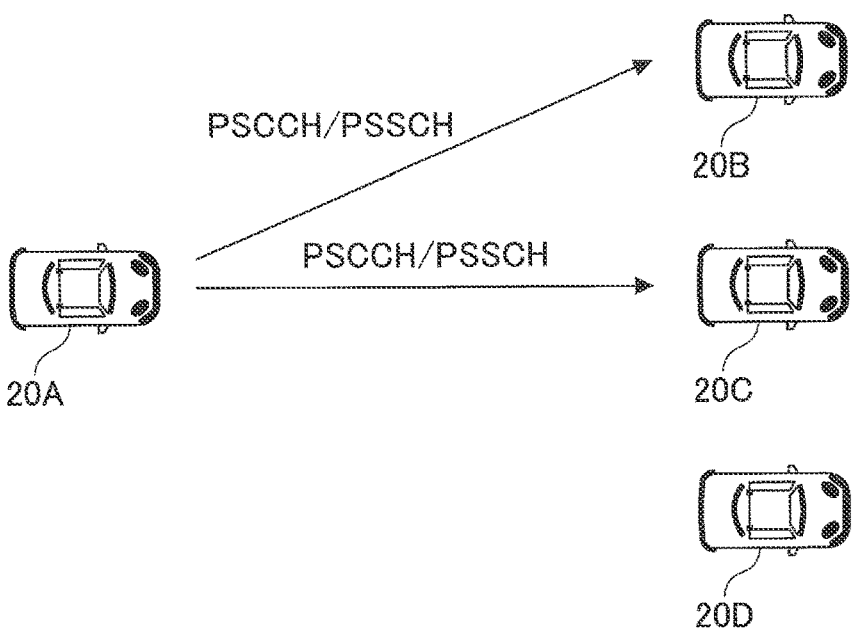
FIG. 7 is a diagram illustrating an example (1) of a communication type of the V2X.

FIG. 7 is a diagram illustrating an example (1) of a communication type of the V2X. The communication type of the sidelink illustrated in FIG. 7 is a unicast. The terminal 20A transmits the PSCCH and the PSSCH to the terminal 20. In the example illustrated in FIG. 7, the terminal 20A unicasts to the terminal 20B, and also unicasts to a terminal 20C.

Figure 8:
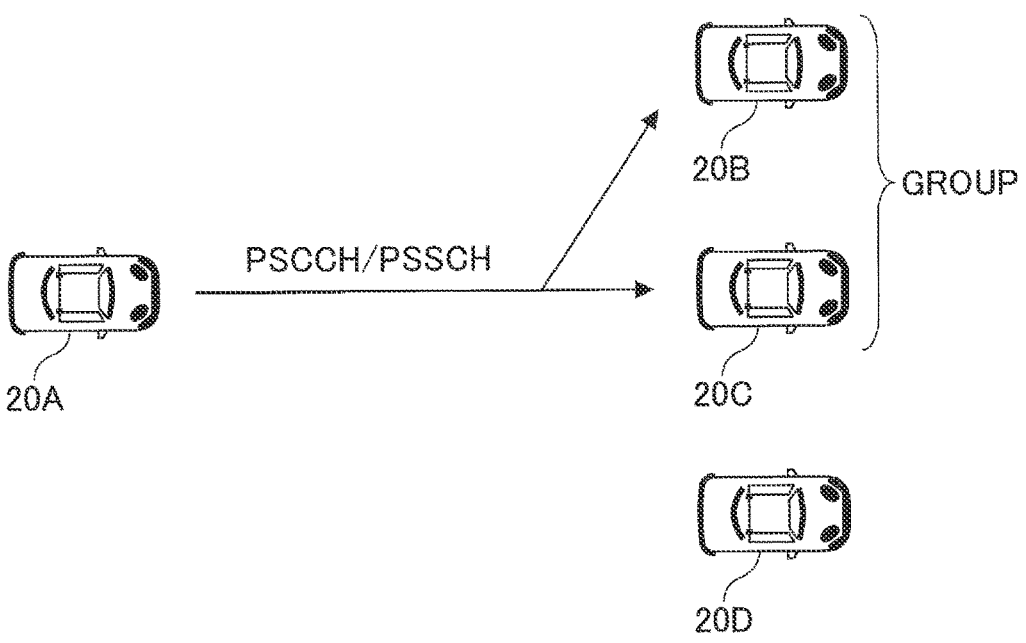
FIG. 8 is a diagram illustrating an example (2) of the communication type of the V2X.

FIG. 8 is a diagram illustrating an example (2) of the communication type of the V2X. The communication type of the sidelink illustrated in FIG. 8 is a groupcast. The terminal 20A transmits the PSCCH and the PSSCH to a group to which one or a plurality of terminals 20 belong. In the example illustrated in FIG. 8, the group includes the terminal 20B and the terminal 20C, and the terminal 20A groupcasts to the group.

Figure 9:
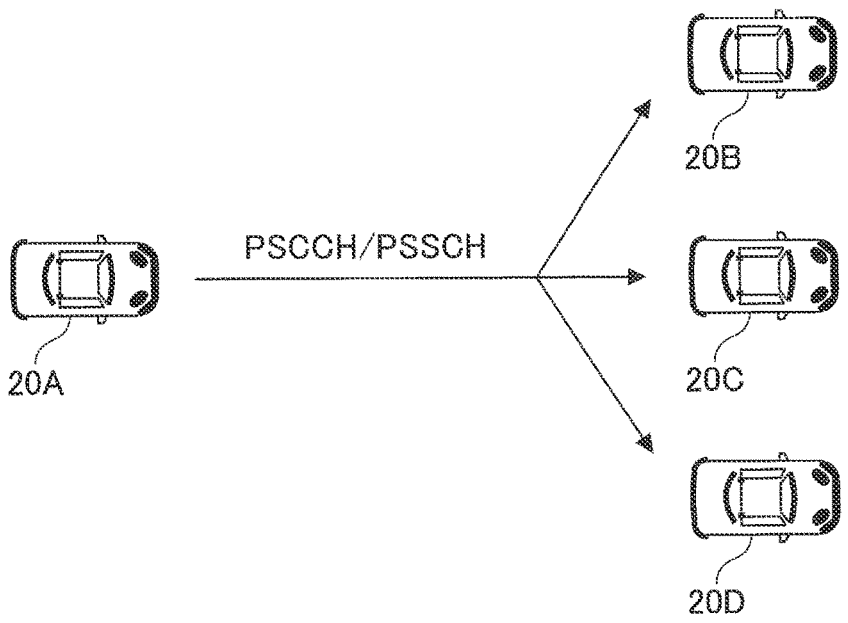
FIG. 9 is a diagram illustrating an example (3) of the communication type of the V2X.

FIG. 9 is a diagram illustrating an example (3) of the communication type of the V2X. The communication type of the sidelink illustrated in FIG. 9 is a broadcast. The terminal 20A transmits the PSCCH and the PSSCH to one or a plurality of terminals 20. In the example illustrated in FIG. 9, the terminal 20A broadcasts to the terminal 20B, the terminal 20C, and a terminal 20D. The terminal 20A illustrated in FIG. 7 through FIG. 9 may be referred to as a header UE (header-UE).

In addition, it is assumed that the HARQ (Hybrid Automatic Repeat reQuest) is supported by the unicast and groupcast of the sidelink in the NR-V2X. Further, the SFCI (Sidelink Feedback Control Information) including a HARQ response is defined in the NR-V2X. Moreover, there are discussions to transmit the SFCI via a PSFCH (Physical Sidelink Feedback CHannel).

In the following description, the PSFCH is used for the transmission of the HARQ-ACK in the sidelink, as an example. For example, the PSCCH may be used to transmit the HARQ-ACK in the sidelink, or the PSSCH may be used to transmit the HARQ-ACK in the sidelink, or other channels may be used to transmit the HARQ-ACK in the sidelink.

Hereinafter, for the sake of convenience, the overall information reported by the terminal 20 in the HARQ is referred to as the HARQ-ACK. This HARQ-ACK may also be referred to as the HARQ-ACK information. More particularly, the codebook applied to the information of the HARQ-ACK reported from the terminal 20 to the base station 10 or the like is referred to as the HARQ-ACK codebook. The HARQ-ACK codebook defines the bit strings of the HARQ-ACK information. The "HARQ-ACK" transmits not only an ACK but also a NACK.

Figure 10:
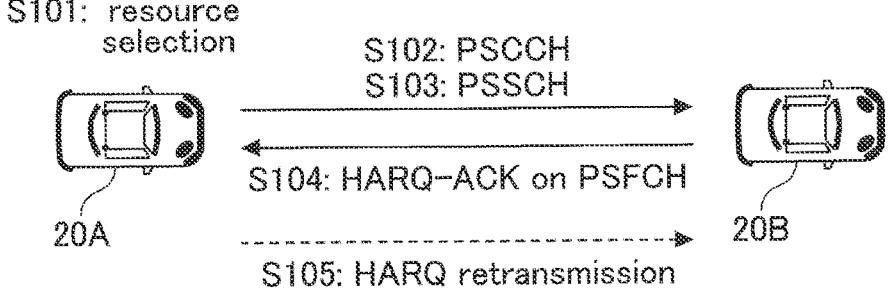
FIG. 10 is a sequence diagram illustrating an example (1) of an operation of the V2X.

FIG. 10 is a diagram illustrating an example (1) of the configuration and operation of the wireless communication system according to one embodiment of the present invention. As illustrated in FIG. 10, the wireless communication system according to one embodiment of the present invention includes the terminal 20A, and the terminal 20B. In actual practice, a large number of user devices are present, but FIG. 10 illustrates the terminal 20A and the terminal 20B as an example.

Hereinafter, when the terminals 20A, 20B, or the like are not particularly distinguished from one another, the term "terminal 20" or "user device" will be simply used. Although FIG. 10 illustrates an example of a case where both the terminal 20A and the terminal 20B are located within a cell coverage, the operation according to the embodiments of the present invention can also be applied to a case where the terminal 20B is outside the coverage.

As described above, in this embodiment, the terminal 20 is a device mounted in the vehicle, such as an automobile or the like, and includes a cellular communication function as the UE of the LTE or NR, and a sidelink function. The terminal 20 may be a general portable terminal (a smartphone or the like). In addition, the terminal 20 may be an RSU. The RSU may be a UE-type RSU including functions of the UE, or a gNB-type RSU including functions of a base station device.

The terminal 20 need not be a device accommodated within a single housing. For example, in a case where various sensors are distributed and arranged inside the vehicle, the terminal 20 may be the device including the various sensors.

The contents of the sidelink transmission of the terminal to be processed are basically the same as the contents of the UL transmission in the LTE or NR to be processed. For example, the terminal 20 scrambles code words of the transmission data, performs modulation to generate complex-valued symbols, and maps the complex-valued symbols to one or two layers, thereby performing a precoding. The precoded complex-valued symbols are then mapped to a resource element, to generate a transmission signal (for example, a complex-valued time-domain SC-FDMA signal), and the transmission signal is transmitted from each antenna port.

The base station 10 includes the cellular communication function as a base station of the LTE or NR, and a function (for example, resource pool setting, resource allocation, or the like) to enable the communication of the terminal 20 according to this embodiment. In addition, the base station 10 may be an RSU (gNB-type RSU).

In the wireless communication system according to the embodiments of the present invention, a signal waveform used by the terminal 20 for the SL or UL may be the OFDMA, the SC-FDMA, or other signal waveforms.

In step S101, the terminal 20A autonomously selects the resources to be used for the PSCCH and the PSSCH from the resource selection window having a predetermined period of time. The resource selection window may be set by the base station 10 to the terminal 20.

In step S102 and step S103, the terminal 20A transmits the SCI (Sidelink Control Information) via the PSCCH and transmits the SL data via the PSSCH, using the resources autonomously selected in step S101. For example, the terminal 20A may transmit the SCI (PSCCH), using the same time resource as a time resource of the PSSCH, and using a frequency resource adjacent to a frequency resource of the PSSCH.

The terminal 20B receives the SCI (PSCCH) and the SL data (PSSCH) transmitted from the terminal 20A. The SCI received by the PSCCH may include information of the resource of the PSFCH for transmitting a HARQ-ACK from the terminal 20B with respect to the received data. The terminal 20A may include the information of the autonomously selected resource in the SCI that is transmitted.

In step S104, the terminal 20B transmits the HARQ-ACK with respect to the received data to the terminal 20A, using the resource of the PSFCH specified by the received SCI.

In step S105, in a case where the HARQ-ACK received in step S104 indicates a retransmission request, that is, a NACK (Negative Acknowledgement), the terminal 20A retransmits the PSCCH and the PSSCH to the terminal 20B. The terminal 20A may retransmit the PSCCH and the PSSCH using the autonomously selected resources.

In a case where a HARQ control is not performed, step S104 and step S105 may be omitted.

Figure 11:
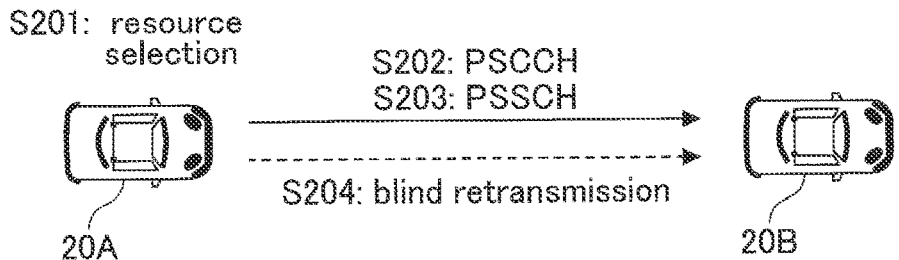
FIG. 11 is a sequence diagram illustrating an example (2) of the operation of the V2X.

FIG. 11 is a diagram illustrating an example (2) of the configuration and operation of the wireless communication system according to one embodiment of the present invention. A blind retransmission may be performed, without the HARQ control for improving a success rate or range of the transmission.

In step S201, the terminal 20A autonomously selects the resources for use in the PSCCH and the PSSCH from the resource selection window having the predetermined period of time. The resource selection window may be set from the base station 10 to the terminal 20.

In step S202 and step S203, the terminal 20A transmits the SCI by the PSCCH and transmits the SL data by the PSSCH, using the resources autonomously selected in step S201. For example, the terminal 20A may transmit the SCI (PSCCH) with the same time resource as the time resource of the PSSCH, using the frequency resource adjacent to the frequency resource of the PSSCH.

In step S204, the terminal 20A retransmits the SCI by the PSCCH and the SL data by the PSSCH to the terminal 20B, using the resources autonomously selected in step S201. The retransmission in step S204 may be performed a plurality of times.

In a case where the blind retransmission is not performed, step S204 may be omitted.

Figure 12:
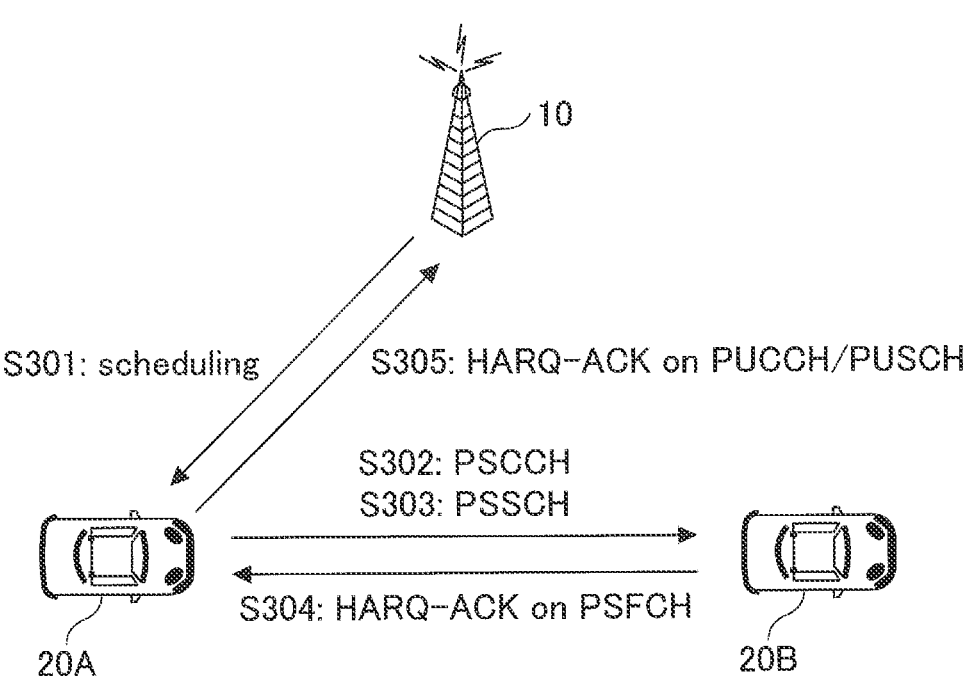
FIG. 12 is a sequence diagram illustrating an example (3) of the operation of the V2X.

FIG. 12 is a diagram illustrating an example (3) of the configuration and operation of the wireless communication system according to one embodiment of the present invention. The base station 10 may perform a scheduling of the sidelink. In other words, the base station 10 may determine the resource of the sidelink to be used by the terminal 20, and transmit information indicating the resource to the terminal 20. In addition, in a case where the HARQ control is applied, the base station 10 may transmit information indicating the resource of the PSFCH to the terminal 20.

In step S301, the base station 10 performs the SL scheduling by transmitting DCI (Downlink Control Information) with respect to the terminal 20A by the PDCCH. For the sake of convenience, the DCI for the SL scheduling will hereinafter be referred to as a SL scheduling DCI.

Moreover, in step S301, it is assumed that the base station 10 also transmits the DCI for a DL scheduling (may also be referred to as a DL allocation) with respect to the terminal 20A by the PDCCH. For the sake of convenience, the DCI for the DL scheduling will hereinafter be referred to as a DL scheduling DCI. The terminal 20A, which receives the DL scheduling DCI, receives DL data by the PDSCH using the resource specified by the DL scheduling DCI In step S302 and step S303, the terminal 20A transmits the SCI (Sidelink Control Information) by the PSCCH, using the resource specified by the SL scheduling DCI, and transmits the SL data by the PSSCH. In SL scheduling DCI, only the resource of the PSSCH may be specified. In this case, the terminal 20A may transmit the SCI (PSCCH) with the same time resource as the time resource of the PSSCH, using the frequency resource adjacent to the frequency resource of the PSSCH, for example.

The terminal 20B receives the SCI (PSCCH) and the SL data (PSSCH) transmitted from the terminal 20A. The SCI received by the PSCCH includes the information of the resource of the PSFCH for transmitting the HARQ-ACK from the terminal 20B with respect to the received data.

The information of the resource is included in the DL scheduling DCI or the SL scheduling DCI transmitted from the base station 10 in step S301, and the terminal 20A acquires the information of the resource from the DL scheduling DCI or the SL scheduling DCI and includes the acquired information in the SCI. Alternatively, the information of the resource may be omitted from the DCI transmitted from the base station 10, and the terminal 20A may autonomously include the information of the resource in the SCI when transmitting the same.

In step S304, the terminal 20B transmits the HARQ-ACK with respect to the received data to the terminal 20A, using the resource of the PSFCH specified by the received SCI.

In step S305, the terminal 20A transmits the HARQ-ACK using the resource of the PUCCH (Physical Uplink Control CHannel) specified by the DL scheduling DCI (or the SL scheduling DCI), at a timing (for example, a timing in units of slots) specified by the DL scheduling DCI (or the SL scheduling DCI), for example, and the base station 10 receives the HARQ-ACK. The HARQ-ACK codebook may include the HARQ-ACK received from the terminal 20B, and the HARQ-ACK with respect to the DL data. However, in a case where there is no DL data allocation or the like, the HARQ-ACK with respect to the DL data is not included in the codebook.

In the case where the HARQ control is not performed, step S304 and step S305 may be omitted.

Figure 13:
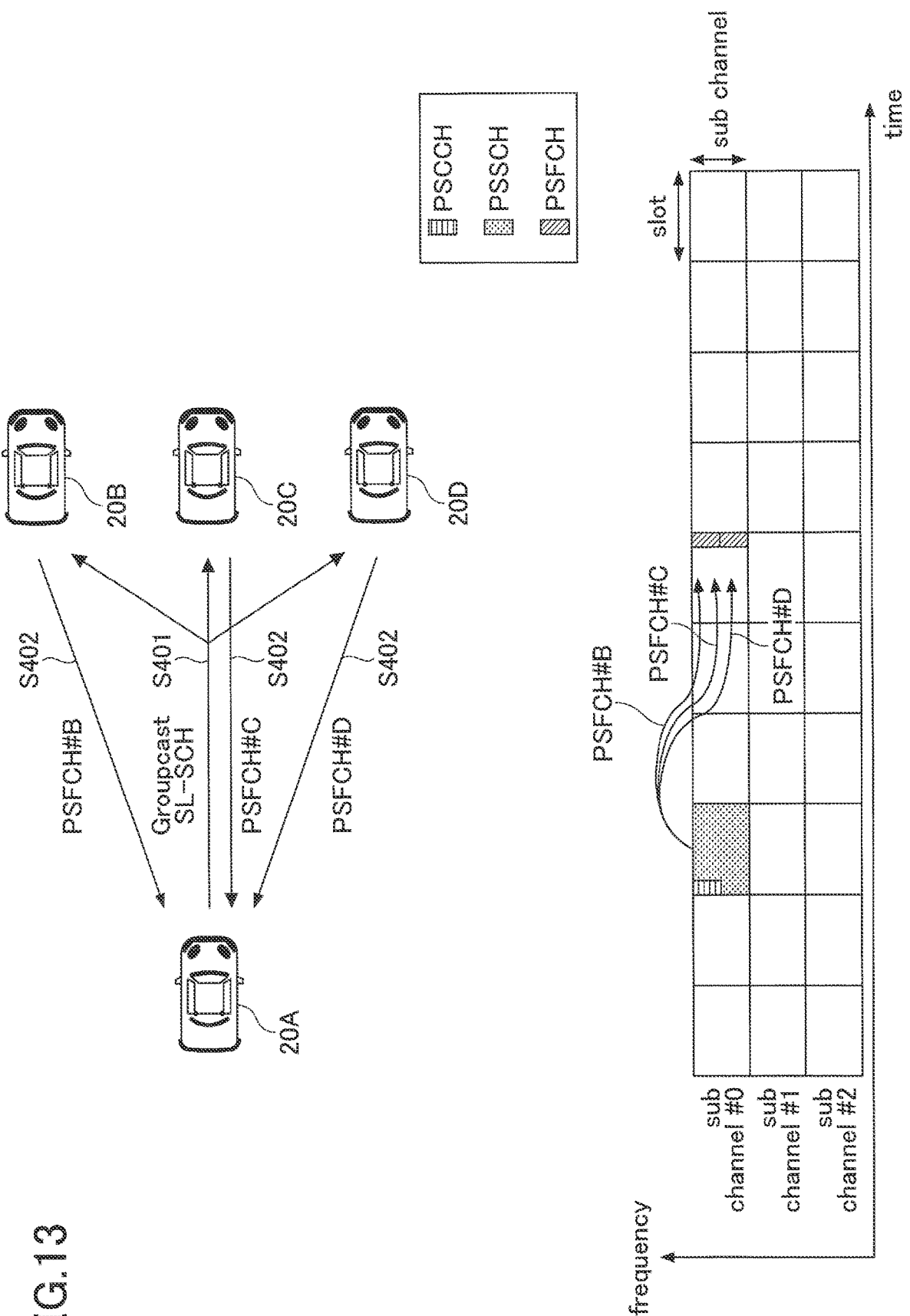
FIG. 13 is a sequence diagram illustrating an example (4) of the operation of the V2X.

FIG. 13 is a diagram illustrating an operation example (4) according to one embodiment of the present invention. As described above, the sidelink of the NR supports the transmission of the HARQ response by the PSFCH. A format similar to a PUCCH (Physical Uplink Control CHannel) format 0 may be used as a format of the PSFCH. In other words, the format of the PSFCH may be a sequence-based format with a PRB (Physical Resource Block) size of 1, and in which the ACK and the NACK are identified by a difference between the sequences. The format of PSFCH is not limited to the above. The resource of the PSFCH may be arranged in one symbol or a plurality of symbols at an end of the slot. In addition, the period N may be set, or may be defined in advance, for the PSFCH resource. The period N may be set in units of slots, or defined in advance.

In FIG. 13, a vertical axis corresponds to the frequency domain, and a horizontal axis corresponds to the time domain. The PSCCH may be arranged in one symbol at the start of the slot, or in a plurality of symbols from the start, or in a plurality of symbols from a symbol other than the symbol at the start. The PSFCH may be arranged in one symbol at the end of the slot, or in a plurality of symbols at the end of the slot. In the example illustrated in FIG. 13, three subchannels are set in the resource pool, and two PSFCHs are arranged in the third slot after the slot in which the PSSCH is arranged. Arrows from the PSSCH to the PSFCH indicate examples of the PSFCH related to the PSSCH.

In a case where the HARQ response in the groupcast of the NR-V2X is an option 2 which transmits the ACK or the NACK, the resource used to transmit and receive the PSFCH needs to be determined. As illustrated in FIG. 13, in step S401, the terminal 20A, which is the transmitting end terminal 20, performs the groupcast to the terminal 20B, the terminal 20C, and the terminal 20D, which are the receiving end terminals 20, via the SL-SCH. In step S402 which follows, the terminal 20B uses PSFCH #B, the terminal 20C uses PSFCH #C, and the terminal 20D uses PSFCH #D, to transmit the HARQ response to the terminal 20A. As illustrated in the example of FIG. 13, in a case where the usable number of resources of the PSFCH is less than the number of receiving end terminals 20 belonging to the group, it is necessary to determine how the resource of the PSFCH is to be allocated. The transmitting end terminal 20 may obtain the number of end terminals 20 receiving the groupcast. In a case where the HARQ response in the groupcast of the NR-V2X is an option 1, only the NACK is transmitted in one PSFCH shared by the groupcast.

As described above, the HARQ feedback is supported by the NR sidelink. In addition, according to the NR Sidelink Release 16, the PSFCH format 0 was defined as one of the PSFCH formats for transmitting the HARQ-ACK. The PSFCH format 0 is a sequence-based format, similar to the PUCCH format. In the PSFCH format 0, the sequence to be used is determined by referring to the sequence for the PUCCH.

Figure 14:
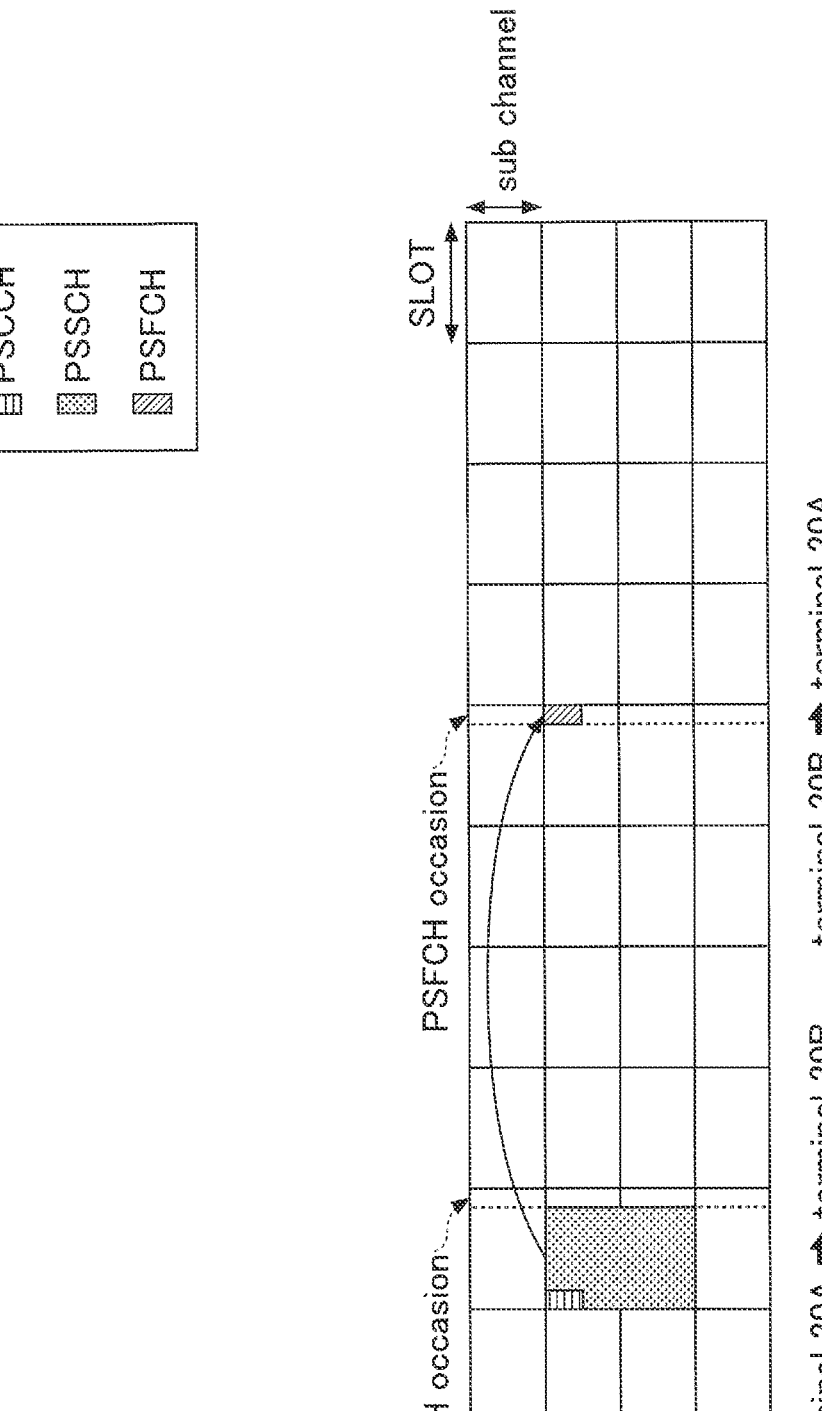
FIG. 14 is a diagram illustrating an example of a HARQ response in one embodiment of the present invention.

FIG. 14 is a diagram illustrating an example of the HARQ response in one embodiment of the present invention. As illustrated in FIG. 14, when transmitting the PSCCH and the PSSCCH from the terminal 20A to the terminal 20B, the HARQ response is transmitted from the terminal 20B using the PSFCH format 0 and received by the terminal 20A, during a PSFCH occasion.

For example, when the receiving terminal 20B transmits a 1-bit HARQ-ACK via the PSFCH, the ACK or NACK may apply a different cyclic shift to the same base sequence in the same PRB. The cyclic shift corresponding to the ACK may not be defined or used in a groupcast option 1. The groupcast option 1 is a HARQ feedback operation in which each receiving end terminal 20B transmits only the NACK via one PSFCH shared by the groupcast, and a group cast option 2 is a HARQ feedback operation in which each receiving end terminal 20B transmits the ACK or NACK using a different PSFCH in the groupcast.

In addition, when the CDM (Code Division Multiple Access) is applied to the PSFCH transmitted by the different terminals 20 in the same PRB, for example, the support may be provided as indicated by 1) and 2) below.

1) In the case of a unicast and groupcast option 1, the cyclic shift is selected based on a layer 1 source ID of the transmitting UE.

2) In the case of a groupcast option 2, the cyclic shift is selected based on the layer 1 source ID of the transmitting UE and a member ID of the receiving UE. The member ID may be an ID assigned to the terminal 20 within the group.

Other parameters, such as the DM-RS of the PSCCH or the like, for example, may further be applied to the cyclic shift. Moreover, the base sequence of the CDM may be set or defined for each resource pool.

A sequence x(n) of the PSFCH format 0 is generated based on Formula 1.

$$x(n) = r_{u,v}^{\alpha,\delta}(n) \quad n = 0, 1, \ldots, N_{sc}^{RB} - 1 \qquad \text{[Formula 1]}$$

r(n) included in the Formula 1 is the sequence derived from the base sequence (for details, refer to Non-Patent Document 1, for example). $\alpha$ is the cyclic shift. $\delta$ is a parameter related to the sequence length, and may be set to $\delta = 0$ in the PSFCH format 0. As indicated by the Formula 1, x(n) may be defined for the number of subcarriers per one resource block.

u is determined based on Formula 2, and indicates a sequence group. v indicates the sequence number.

$$u = (f_{gh} + f_{ss}) \bmod 30 \qquad \text{[Formula 2]}$$

As indicated by the Formula 2, $f_{gh}$ and $f_{SS}$ which determine u, may be determined based on the following Formula 3, Formula 4, or Formula 5.

For example, the parameters u and v associated with x(n) may be determined based on the Formula 3, if neither the group hopping nor the sequence hopping is applied.

$$f_{gh} = 0 \qquad \text{[Formula 3]}$$
$$f_{ss} = n_{ID} \bmod 30$$
$$v = 0$$

$n_{ID}$ included in the Formula 3 may be a cell ID or may be set by a parameter of the higher layer.

For example, the parameters u and v associated with x(n) may be determined based on the Formula 4, if the group hopping is applied and the sequence hopping is not applied.

$$f_{gh} = \left( \sum\nolimits_{m=0}^{7} 2^m c\big(8\big(2n_{s,f}^{\mu} + n_{hop}\big) + m\big) \right) \bmod 30 \qquad \text{[Formula 4]}$$
$$f_{ss} = n_{ID} \bmod 30$$
$$v = 0$$

$n_{s,f}^{\mu}$ included in the Formula 4 is a slot number in a radio frame. $\mu$ is a parameter indicating a subcarrier interval. A pseudo-random sequence c(i) may be initialized to $c_{init} = \text{floor}(n_{ID}/30)$ for every radio frame. $N_{hop}$ may be set to 0 if an intra-slot frequency hopping is disabled, and may be set to $n_{hop} = 0$ at the first hop and to $n_{hop} = 1$ at the second hop, if the intra-slot frequency hopping is enabled.

For example, the parameters u and v associated with x(n) may be determined based on the Formula 5, if the group hopping is not applied and sequence hopping is applied.

$$f_{gh} = 0 \qquad \text{[Formula 5]}$$
$$f_{ss} = n_{ID} \bmod 30$$
$$v = c\big(2n_{s,f}^{\mu} + n_{hop}\big)$$

As indicated by the Formula 5, v is set by c(i) which is determined based on $n_{s,f}^{\mu}$ and $n_{hop}$.

u or v described above may be determined as indicated by 1) through 6) below.

1) A fixed value may be defined by specifications, or a value may be set, or a value may be preset, as u=X. For example, X may be 0, or other values. By defining u in this manner, the group hopping associated with the CDM of the PSFCH can be realized using a simple configuration.

2) Fixed values may be defined by the specifications, or values may be set, or values may be preset, as $f_{gh}$=Y and $f_{SS}$=Z. For example, Y and Z may each be 0, or may be other values. By setting $f_{gh}$ and $f_{SS}$ and determining u in this manner, it is possible to implement group hopping associated with the CDM of the PSFCH by a simple configuration.

In addition, Y and Z may be determined by the Formula 3, the Formula 4, or the Formula 5. By setting $f_{gh}$ and $f_{SS}$ and determining u in this manner, the group hopping associated with the CDM of the PSFCH can be configured to have a common configuration as the NR-Uu (PUCCH format), thereby improving a quality of the PSFCH.

Further, a fixed value or a calculation formula may be defined by the specifications, or a value may be set, or a value may be preset, as nip, and nip may be determined based on the ID of the transmitting UE or/and receiving UE, determined by the same parameter (for example, hoppingId) as the Uu, or determined by a new higher layer parameter (for example, hoppingId-SL). By setting nip and determining u in this manner, the group hopping associated with the CDM of the PSFCH can be configured to have a common configuration as the NR-Uu (PUCCH format), thereby improving the quality of the PSFCH particularly when a plurality of UEs use the same RB.

3) u or v may be determined based on the parameter of the higher layer. For example, u or v may be determined depending on whether the new higher layer parameter (for example, pucch-GroupHopping-SL) is one of "neither", "enable", and "disable". By determining u or v in this manner, an optimum configuration for the system applied with the hopping can be selected.

In addition, u or v may be determined based on the same parameter (for example, pucch-GroupHopping) as Uu. By determining u or v in this manner, the group hopping associated with the CDM of the PSFCH can be configured to have the common configuration as the NR-Uu (PUCCH format), and an amount of interference can be expected to be approximately the same as that of the corresponding Uu.

4) A fixed value may be defined by the specifications, or a value may be set, or a value may be preset, as $n_{hop}$=P applied to the Formula 4 or the Formula 5. For example, P=0 or other values may be used. By setting $n_{hop}$ and determining u or v in this manner, the configuration can be made simple, and the configuration can be optimized for the system in which the intra-slot frequency hopping is not applied.

5) A fixed value may be defined by the specifications, a value may be set, or a value may be preset, as v=Q. For example, Q=0 or other values may be used. By defining v in this manner, the configuration can be made simple.

6) Further, a fixed value or a calculation formula may be defined by the specifications, or a value may be set, or a value may be preset, as $c_{init}$=R. For example, R=0 or other values may be used. By defining R in this manner, the configuration can be made simple.

In addition, R=floor($n_{ID}$/30) or R=$2^5$*floor($n_{ID}$/30)+$n_{ID}$ mod 30, for example. By setting $C_{INIT}$ and determining u or v in this manner, the hopping associated with the CDM of the PSFCH can be configured to have the common configuration as the NR-Uu (PUCCH format), thereby improving the quality of the PSFCH particularly when a plurality of UEs use the same RB.

For example, R may be calculated based on a function $n_{CS}(n_{s,f}^{\mu}, 1)$ which derives a value using the pseudo-random sequence c(i) for the calculation of the cyclic shift value of the PSFCH indicated by the Formula 6.

$$n_{CS}\left(n_{s,f}^{\mu}, l\right) = \sum_{m=0}^{7} 2^m c\left(8 N_{symb}^{slot} n_{s,f}^{\mu} + 8l + m\right) \qquad \text{[Formula 6]}$$

l denotes an OFDM symbol number of the PSFCH transmission, and $N_{symb}^{slot}$ denotes a number of symbols per slot. By setting $C_{INIT}$ and determining u or v in this manner, a common configuration may be utilized as the configuration used for the hopping of the PSFCH and the configuration used for the cyclic shift.

According to the embodiments described above, the terminal 20 can transmit the PSFCH to the other terminal 20 using the PSFCH format to which the CDM is applied, wherein the group hopping and/or the sequence hopping configured for the sidelink is used for the CDM.

In other words, the HARQ (Hybrid Automatic Repeat reQuest) response of the terminal-to-terminal direct communication can be transmitted and received using the format for the terminal-to-terminal direct communication.

(Device Configuration)

Next, a functional configuration example of the base station 10 and the terminal 20 for performing the processes and operations described above will be described. The base station 10 and the terminal 20 include functions for implementing the embodiments described above. However, each of the base station 10 and the terminal 20 may include only a part of the functions of the embodiment.

<Base Station 10>

Figure 15:
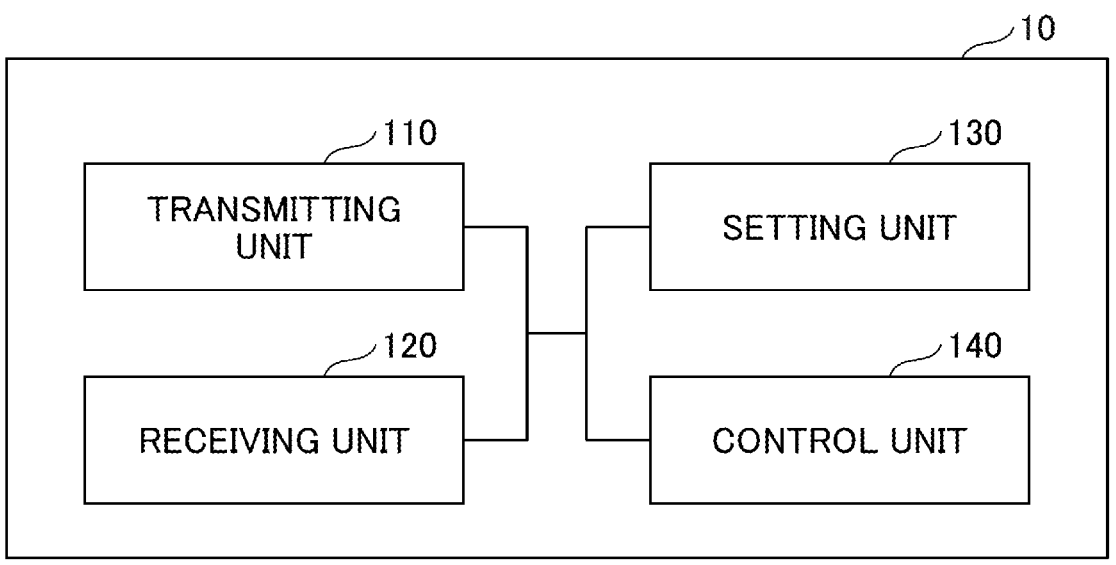
FIG. 15 is a diagram illustrating an example of a functional configuration of a base station 10 according to one embodiment of the present invention.

FIG. 15 is a diagram illustrating an example of a functional configuration of the base station 10. As illustrated in FIG. 15, the base station 10 includes a transmitting unit 110, a receiving unit 120, a setting unit 130, and a control unit 140. The functional configuration illustrated in FIG. 15 is merely one example. As long as the operation according to the embodiments of the present invention can be performed, the functional categorizations and the name of the functional parts may be arbitrarily selected.

The transmitting unit 110 includes functions for generating a signal to be transmitted to the terminal 20, and performing a wireless transmission of the signal. The receiving unit 120 includes functions for receiving various signals transmitted from the terminal 20, and acquiring, for example, information of a higher layer from the received signals. In addition, the transmitting unit 110 includes functions for transmitting the NR-PSS, NR-SSS, NR-PBCH, DL/UL control signal, DL reference signal, or the like to the terminal 20.

The setting unit 130 stores the preset setting information and various setting information to be transmitted to the terminal 20 in a storage device, and reads the preset setting information from the storage device, as appropriate. The contents of the setting information are, for example, information related to the setting of the D2D communication or the like.

As described in the embodiments, the control unit 140 performs the process related to the setting for the terminal 20 to perform the D2D communication. In addition, the control unit 140 transmits the scheduling of the D2D communication and the DL communication to the terminal 20 via the transmitting unit 110. Moreover, the control unit 140 receives information related to the HARQ response of the D2D communication and the DL communication from the terminal 20 via the receiving unit 120. A functional part of the control unit 140 related to the signal transmission may be included in the transmitting unit 110, and a functional part of the control unit 140 related to the signal reception may be included in the receiving unit 120.

<Terminal 20>

Figure 16:
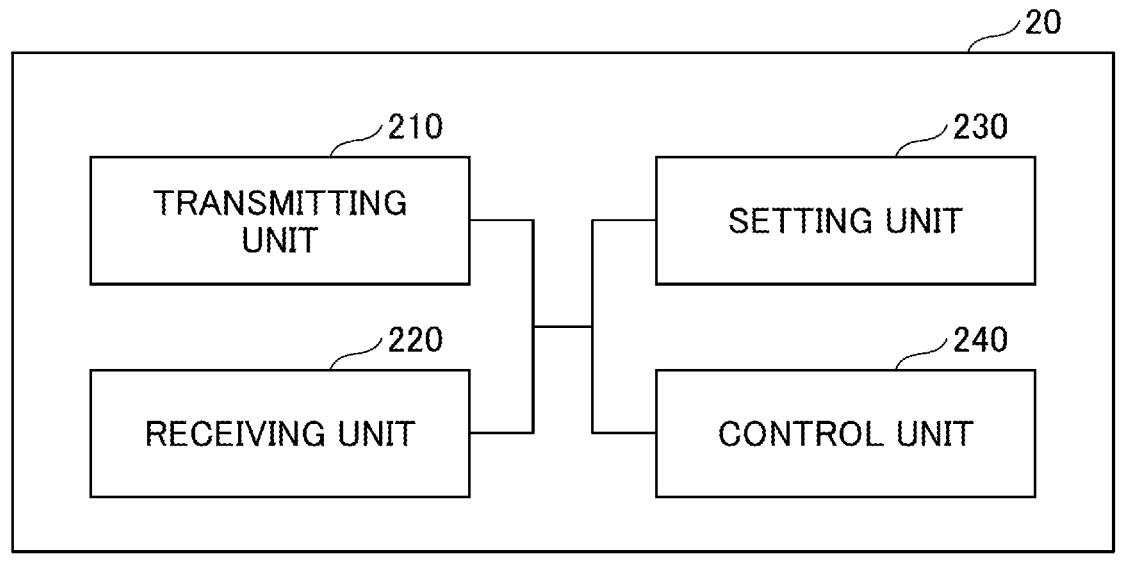
FIG. 16 is a diagram illustrating an example of a functional configuration of a terminal 20 according to one embodiment of the present invention.

FIG. 16 is a diagram illustrating an example of a functional configuration of the terminal 20. As illustrated in FIG. 16, the terminal 20 includes a transmitting unit 210, a receiving unit 220, a setting unit 230, and a control unit 240. The functional configuration illustrated in FIG. 16 is merely one example. As long as the operation according to the embodiments of the present invention can be performed, the functional categorizations and the name of the functional parts may be arbitrarily selected.

The transmitting unit 210 creates a transmission signal from the transmission data, and performs a wireless transmission of the transmission signal. The receiving unit 220 performs a wireless reception of various signals, and acquires signals of higher layers from the received signals of the physical layers. In addition, the receiving unit 220 includes functions to receive the NR-PSS, NR-SSS, NR-PBCH, and DL/UL/SL control signals or reference signals transmitted from the base station 10. Moreover, the transmitting unit 210 transmits the PSCCH (Physical Sidelink Control Channel), the PSSCH (Physical Sidelink Shared Channel), the PSDCH (Physical Sidelink Discovery Channel), the PSBCH (Physical Sidelink Broadcast Channel), the PSFCH (Physical Sidelink Feedback Channel), or the like, for example, to the other terminal 20 as the D2D communication, and the receiving unit 220 receives the PSCCH, the PSSCH, the PSDCH, the PSDCH, the PSFCH, or the like from the other terminal 20.

The setting unit 230 stores various setting information received from the base station 10 or the terminal 20 by the receiving unit 220 in the storage device, and reads the stored setting information from the storage device, as appropriate. The setting unit 230 also stores the preset setting information. The contents of the setting information are, for example, information related to the setting of the D2D communication or the like.

The control unit 240 controls the D2D communication with the other terminal 20 under a multicarrier environment, as described in the embodiments. The control unit 240 performs the processing related to the HARQ of the D2D communication and the DL communication. In addition, the control unit 240 transmits information related to the HARQ response of the D2D communication and the DL communication to the other terminal 20, scheduled from the base station 10. Moreover, the control unit 240 may schedule the D2D communication to the other terminal 20. The control unit 240 may autonomously select the resource used for the D2D communication from the resource selection window. The control unit 240 performs the processing related to the MCS in the transmission and reception of the D2D communication. A functional part of the control unit 240 related to the signal transmission may be included in the transmitting unit 210, and a functional part of the control unit 240 related to signal reception may be included in the receiving unit 220.

(Hardware Configuration)

Block diagrams (FIG. 15 and FIG. 16) used in the description of the above embodiments illustrate the blocks in units of functions. These functional blocks (functional parts) may be implemented by an arbitrary combination of at least one of hardware and software. In addition, the implementation method of each of the functional blocks is not particularly limited. In other words, each functional block may be implemented using a single device that is physically or logically integrated, or using two or more devices that are physically or logically separated and directly or indirectly connected (for example, using cable, wireless, or the like). The functional block may be implemented by a combination of software and the single device or the plurality of devices described above.

The functions include, but are not limited to, judgment, determination, decision, calculation, computation, processing, derivation, research, search, verification, reception, transmission, output, access, resolution, selection, designation, establishment, comparison, assumption, expectation, deeming, broadcast (broadcasting), notification (notifying), communication (communicating), forward (forwarding), configuration (configuring), reconfiguration (reconfiguring), allocation (allocating, mapping), and assignment (assigning). For example, a functional block (functional part) that functions to cause a transmission is called a transmitting unit (transmitting unit) or a transmitting device (transmitter). In either case, as described above, the realization method is not particularly limited.

Figure 17:
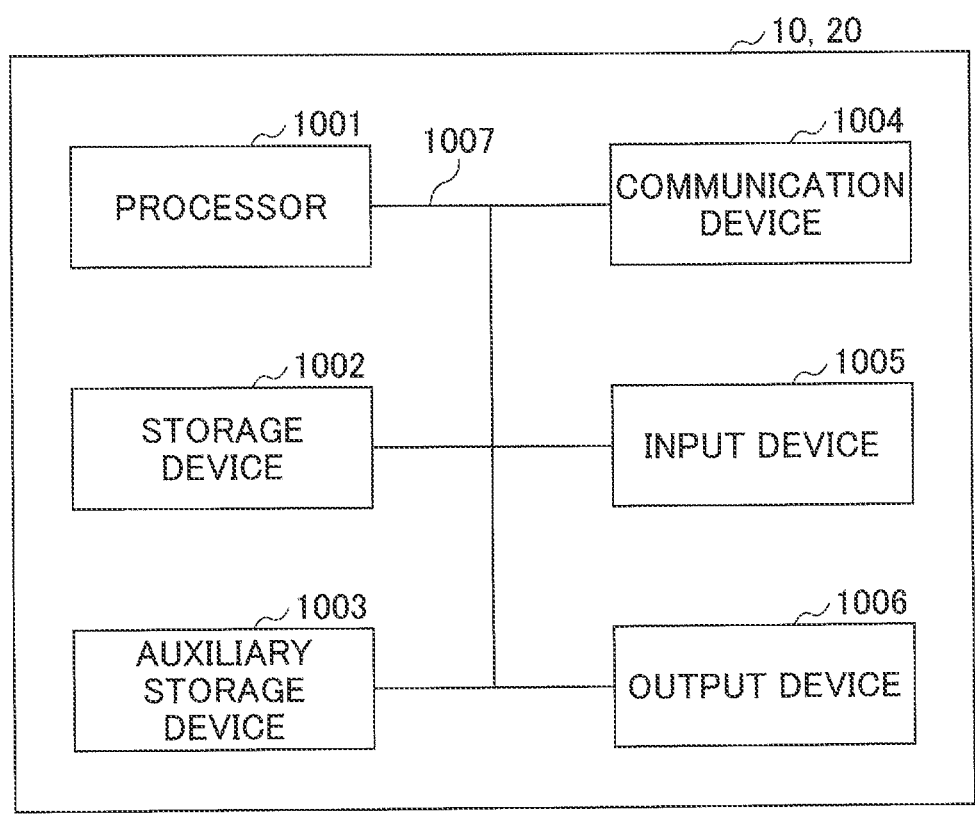
FIG. 17 is a diagram illustrating an example of a hardware configuration of the base station 10 or the terminal 20 according to one embodiment of the present invention.

For example, the base station 10, the terminal 20, or the like according to one embodiment of the present disclosure may function as a computer for processing the wireless communication method of the present disclosure. FIG. 17 is a diagram illustrating an example of the hardware configuration of the base station 10 and the terminal 20 according to one embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, or the like.

In the following description, the term "device" may alternatively referred to as a circuit, a device, a unit, or the like. The hardware configuration of the base station 10 and terminal 20 may be configured to include one or a plurality of the devices illustrated in the figures, or may be configured not to include a part of the devices.

Each function of the base station 10 and the terminal 20 may be realized by reading predetermined software (program) to hardware such as the processor 1001, the storage device 1002, or the like, and performing an operation by the processor 1001, to control the communication by the communication device 1004, or to control at least one of reading and writing of data in the storage device 1002 and the auxiliary storage device 1003.

The processor 1001 operates an operating system, for example, to control the entire computer. The processor 1001 may be formed by a central processing unit (CPU: Central Processing Unit) including an interface with peripheral devices, a control unit, an arithmetic unit, a register, or the like. For example, the control unit 140, the control unit 240, or the like described above may be realized by the processor 1001.

In addition, the processor 1001 reads a program (program codes), a software module, data, or the like from at least one of the auxiliary storage device 1003 and the communication device 1004, to the storage device 1002, and performs various types of processing in accordance with the read information. As the program, a program that causes a computer to execute at least a part of the operation described in the above embodiments, is used. For example, the control unit 140 of the base station 10 illustrated in FIG. 15 may be realized by a control program that is stored in the storage device 1002 and runs on the processor 1001. In addition, for example, the control unit 240 of the terminal 20 illustrated in FIG. 16 may be realized by a control program that is stored in the storage device 1002 and runs on the processor 1001. Although the various processes described above are executed by the single processor 1001 in the description given heretofore, the processes may be executed simultaneously or sequentially by two or more processors 1001. The processor 1001 may be implemented in one or more chips. The program may be transmitted from a network via a telecommunication line.

The storage device 1002 is a computer-readable recording medium, and may be formed by at least one of a ROM (Read Only Memory), an EPROM (Erasable Programmable ROM), an EEPROM (Electrically Erasable Programmable ROM), a RAM (Random Access Memory), or the like, for example. The storage device 1002 may be referred to as a register, a cache, a main memory (main storage), or the like. The storage device 1002 can store programs (program codes), software modules, or the like that are executable to implement the communication method according to one embodiment of the present disclosure.

The auxiliary storage device 1003 is a computer-readable recording medium, and may be formed by at least one of an optical disk, such as a CD-ROM (Compact Disc ROM), a hard disk drive, a flexible disk, a magneto-optical disk (for example, a compact disk, a digital versatile disk, a Blu-ray (registered trademark) disk, a smart card, a flash memory (for example, a card, a stick, a key drive), a floppy disk (registered trademark), a magnetic strip, or the like. The storage medium described above may be, for example, a database, a server, or other suitable medium that includes at least one of the storage device 1002 and the auxiliary storage device 1003.

The communication device 1004 is a hardware (transmitting/receiving device) for performing communication between computers via at least one of a cable network and a wireless network, and is also referred to as a network device, a network control unit, a network card, a communication module, or the like, for example. The communication device 1004 may include a high-frequency switch, a duplexer, a filter, a frequency synthesizer, or the like, for example, to implement at least one of a frequency division duplexing (FDD: Frequency Division Duplexing) and a time division duplexing (TDD: Time Division Duplexing). For example, a transmitting/receiving antenna, an amplifier part, a transceiver part, a transmission line interface, or the like may be implemented by the communication device 1004. The transmitting unit and the receiving unit of the transceiver part may be physically or logically separated.

The input device 1005 is an input device (for example, a keyboard, a mouse, a microphone, a switch, a button, a sensor, or the like) that accepts an external input. The output device 1006 is an output device (for example, a display, a speaker, a LED lamp, or the like) that implements an external output. The input device 1005 and the output device 1006 may have an integrated configuration (for example, a touchscreen panel).

Each of the devices, such as the processor 1001, the storage device 1002, or the like, is connected by the bus

1007 for communicating information. The bus 1007 may be formed using a single bus, or may be formed using different buses between the devices.

The base station 10 and the terminal 20 may be formed to also include hardware such as a microprocessor, a digital signal processor (DSP: Digital Signal Processor), an ASIC (Application Specific Integrated Circuit), a PLD (Programmable Logic Device), an FPGA (Field Programmable Gate Array), or the like, and a part or all of the functional blocks may be realized by the hardware. For example, the processor 1001 may be formed using at least one of such hardware.

Summary of Embodiments

As described above, according to the embodiments of the present invention, there is provided a terminal including a receiving unit configured to receive data from another terminal, a control unit configured to set a first parameter which determines a group hopping, or a second parameter which determines a sequence hopping, the group hopping or the sequence hopping being applied to a channel used for transmitting and receiving a response associated with a retransmission control, and a transmitting unit configured to transmit the response associated with the retransmission control corresponding to the data to the another terminal via the channel to which the group hopping or the sequence hopping is applied, wherein the first parameter and the second parameter are set for a terminal-to-terminal direct communication.

With the configuration described above, the terminal 20 can transmit the PSFCH to the other terminal 20, using the PSFCH format to which the CDM is applied, wherein the group hopping and/or the sequence hopping configured for the sidelink is used for the CDM. In other words, the HARQ (Hybrid Automatic Repeat reQuest) response in the terminal-to-terminal direct communication can be transmitted and received using the format for the terminal-to-terminal direct communication.

The control unit may set the first parameter or the second parameter to a fixed value. With this configuration, the group hopping related to the CDM of the PSFCH can be realized by a simple configuration.

The control unit may set the first parameter based on the third parameter and the fourth parameter, the third parameter may be determined based on at least the pseudo-random sequence and the slot number in the wireless frame, and the fourth parameter may be determined based on the identifier of the terminal itself or the other terminal. With this configuration, the group hopping associated with the CDM of the PSFCH can be configured to have a common configuration as the NR-Uu (PUCCH format), thereby improving the quality of the PSFCH particularly when a plurality of UEs use the same RB.

The control unit may set the first parameter, based on the third parameter and the fourth parameter set by the higher layer parameter. With this configuration, the optimum configuration for the system applied with the hopping can be selected.

The control unit may set the first or second parameter, based on a setting in which the intra-slot frequency hopping is not performed. With this configuration, the optimum configuration for the system, in which the hopping is not applied, can be selected.

Further, according to the embodiments of the present invention, there is provided a communication method of a terminal, the method including receiving data from another terminal, setting a first parameter which determines a group hopping, or a second parameter which determines a sequence hopping, the group hopping or the sequence hopping being applied to a channel used for transmitting and receiving a response associated with a retransmission control, and transmitting the response associated with the retransmission control corresponding to the data to the another terminal via the channel to which the group hopping or the sequence hopping is applied, wherein the first parameter and the second parameter are set for a terminal-to-terminal direct communication.

With the configuration described above, the terminal 20 can transmit the PSFCH to the other terminal 20, using the PSFCH format to which the CDM is applied, wherein the group hopping and/or the sequence hopping configured for the sidelink is used for the CDM. In other words, the HARQ (Hybrid Automatic Repeat reQuest) response in the direct terminal-to-terminal communication can be transmitted and received using the format for the direct terminal-to-terminal communication.

Supplement to Embodiments

Thus, although embodiments of the present invention are described, the disclosed invention is not limited to such embodiments, and various modifications, variations, alternatives, substitutions, or the like will be understood by those skilled in the art. Although specific numerical examples are used to facilitate understanding of the invention, unless otherwise indicated, these numerical examples are merely examples and any appropriate value may be used. Classification of items in the above description is not essential to the present invention, and the items described as two or more items may be used in combination as appropriate, or the items described as one item may be applied to the items described in another item (unless a conflict exists). Boundaries of the functional parts or processing parts in the functional block diagrams do not necessarily correspond to boundaries of the physical components. The operation of the plurality of functional parts may be performed by a physically single component, or the operation of one functional part may be performed by physically plurality of components. As for the processing procedures described in the embodiment, the order of the processing may be interchanged unless a conflict exists. For the sake of convenience of describing the processing, the base station 10 and the terminal 20 are described using the functional block diagrams, but such devices may be realized by hardware, software, or a combination thereof. The software operated by the processor of the base station 10 in accordance with the embodiments of the present invention, and the software operated by the processor of the terminal 20 in accordance with the embodiments of the present invention, may be stored in a suitable recording medium such as the random access memory (RAM), the flash memory, the read only memory (ROM), the EPROM, EEPROM, the register, the hard disk (HDD), the removable disk, the CD-ROM, the database, the server, or the like.

In addition, the information notification is not limited to that of the examples/embodiments described in in present disclosure, and other methods may be used. For example, the information notification may be performed by the physical layer signaling (for example, DCI (Downlink Control Information), UCI (Uplink Control Information)), the higher layer signaling (for example, RRC (Radio Resource Control) signaling, MAC (Medium Access Control) signaling, MIB (Master Information Block), SIB (System Information Block)), other signals, or a combination thereof. The RC signaling may also be referred to as an RRC message, and for example, may be a RRC Connection Setup (RRC Connection Setup) message, an RRC connection reconfiguration (RRC Connection Reconfiguration) message, or the like.

Each example/embodiment described in present disclosure may be applied to at least one system using the LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA 2000 UMB (Ultra Mobile Broadband), IEEE 802.11 (Wi-Fi (registered trademark)), IEEE 802.16 (WiMAX (registered trademark)), IEEE 802.20, UWB (Ultra-Wide Band), Bluetooth (registered trademark), and other suitable systems, and a next generation system that is extended based on such systems. In addition, a plurality of systems may be combined (for example, at least one of the LTE and the LTE-A combined with the 5G, or the like) and applied.

The processing procedures, sequences, flowcharts, or the like of each example/embodiment described herein may be reordered, unless a conflict exists. For example, the methods described in the present disclosure are presented using an exemplary ordering to describe elements of the various steps, however, the ordering is not limited to the specific ordering presented.

The specific operations described in this specification as being performed by the base station 10 may be performed by its higher node in some cases. In a network of one or a plurality of network nodes having the base station 10, it will be apparent that various operations performed for the communication with the terminal 20 may be performed by at least one of the base station 10 and network nodes (for example, MME, S-GW, or the like are conceivable, but not limited thereto) other than the base station 10. Although the number of network nodes other than the base station 10 is 1 in the example illustrated above, the other network nodes may be a combination of a plurality of other network nodes (for example, MME and S-GW).

The information, signals, or the like described in present disclosure can be output from a higher layer (or lower layer) to a lower layer (or higher layer). The information, signals, or the like may also be input and output through a plurality of network nodes.

The input and output information or the like may be stored in a specific location (for example, memory), and managed using a management table. Input and output information or the like may be overwritten, updated, or added. The output information or the like may be deleted. The input information or the like may be transmitted to another device.

The determination in present disclosure may be made according to a value (0 or 1) expressed in 1 bit, by a true or false value (Boolean: true or false), or by a numerical comparison (for example, a comparison with a predetermined value).

The software should be broadly interpreted to mean, whether referred to as software, firmware, middleware, microcode, hardware description language, or by any other name, instructions, sets of instructions, codes, code segments, program codes, programs, subprograms, software modules, applications, software applications, software packages, routines, subroutines, objects, executable files, executable threads, procedures, functions, or the like.

In addition, the software, instructions, information, or the like may also be transmitted and received via a transmission medium. For example, when the software is transmitted from a website, server, or other remote sources using at least one of the cable technology (such as coaxial cable, fiber optic cable, twisted pair, digital subscriber line (DSL: Digital Subscriber Line), or the like) and the wireless technology (infrared, microwave, or the like), at least one of the cable technology and wireless technology is included in the definition of the transmission medium.

The information, signals, or the like described in present disclosure may be represented using any of a variety of different technologies. For example, the data, instructions, commands, information, signals, bits, symbols, chips, or the like, which may be referred to throughout the above description may be represented by voltages, currents, electromagnetic waves, magnetic fields or magnetic particles, optical fields or photons, or any combination thereof.

The terms described in present disclosure and the terms necessary for understanding present disclosure may be replaced by terms having the same or similar meanings. For example, at least one of the channel and the symbol may be a signal (signaling). In addition, the signal may be a message. A component carrier (CC: Component Carrier) may also be referred to as a carrier frequency, cell, frequency carrier, or the like.

The terms "system" and "network" used in the present disclosure are used interchangeably.

Further, the information, parameters, or the like described in the present disclosure may also be expressed using an absolute value, a relative value relative to a predetermined value, or expressed using corresponding other information. For example, the wireless resource may be instructed by an index.

The names used for the parameters described above are not restrictive in any respect. In addition, the mathematical formulas or the like using these parameters may differ from those explicitly disclosed in present disclosure. Since the various channels (for example, PUCCH, PDCCH, or the like) and the information elements may be identified by any suitable name, the various names assigned to these various channels and information elements are not in any way limiting.

In present disclosure, the terms "base station (BS: Base Station)", "wireless base station", "base station", "fixed station (fixed station)", "NodeB", "eNodeB", "gNodeB (gNB)", "access point (access point)", "transmission point (transmission point)", "reception point (reception point)", "transmission/reception point (transmission/reception point)", "cell", "sector", "cell group", "carrier", "component carrier", or the like may be used interchangeably. The base station in some cases may be referred to by terms such as a macro cell, a small cell, a femtocell, a picocell, or the like.

The base station can accommodate one or a plurality of (for example, 3) cells. When the base station accommodates a plurality of cells, the entire coverage area of the base station can be divided into a plurality of smaller areas, and each smaller area can provide communication services by a base station subsystem (for example, an indoor small base station (RRH: Remote Radio Head). The term "cell" or "sector" refers to a portion or all of the coverage area of at least one of the base station and the base station subsystem that provides the communication services using the coverage.

In present disclosure, terms such as "mobile station (MS: Mobile Station)", "user terminal (user terminal)", "user equipment (UE: User Equipment)", "terminal", or the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be referred to as a transmitting unit, a receiving unit, a communication device, or the like. At least one of the base station and the mobile station may be a device mounted on a mobile body, a mobile body itself, or the like. The mobile body may be a vehicle (for example, an automobile, an aircraft, or the like), an unmanned mobile body (for example, a drone, an autonomous vehicle, or the like), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be alternatively referred to as a user terminal. For example, various examples/embodiments of the present disclosure may be applied to a configuration in which the communication between the base station and the user terminal is replaced by the communication (for example, may be referred to as D2D (Device-to-Device), V2X (Vehicle-to-Everything), or the like) among a plurality of terminals 20. In this case, the terminal 20 may have the functions of the base station 10 described above. In addition, the terms "upstream" and "downstream" may be alternatively referred to by terms (for example, "side (side)") corresponding to the terminal-to-terminal communication. For example, an upstream channel, a downstream channel, or the like may be alternatively referred to as a side channel.

Similarly, the user terminal in the present disclosure may be alternatively referred to as the base station. In this case, the base station may have the functions of the user terminal described above.

As used in present disclosure, the terms "determining (determining)" and "determining (determining)" may encompass a wide variety of operations. The "determining" and "determining" may include, for example, "determining" and "determining" the judging (judging), calculating (calculating), computing (computing), processing (processing), deriving (deriving), investigating (investigating), looking up (looking up, search, inquiry) (for example, searching in a table, database, or other data structures), ascertaining (ascertaining), or the like. In addition, the "determining" and "determining" may include "determining" and "determining" the receiving (receiving) (for example, receiving information), transmitting (transmitting) (for example, transmitting information), input (input), output (output), accessing (accessing) (for example, accessing data in memory), or the like. Further, the "determining" and "determining" may include "determining" and "determining" resolving (resolving), selecting (selecting), choosing (choosing), establishing (establishing), comparing (comparing), or the like. That is, the "determining" and "determining" may include "determining" and "determining" a certain operation. Moreover, "determining (determining)" may be alternatively referred to "assuming (assuming)", "expecting (expecting)", "considering (considering)", or the like.

The term "connected (connected)" or "coupled (coupled)" or any variation thereof means any direct or indirect connection or coupling between 2 or more elements, and may include the presence of 1 or more intermediate elements between the 2 elements that are "connected" or "coupled" to each other. The coupling or connection between the elements may be physical, logical, or a combination of thereof. For example, "connected" may be alternatively referred to as "access". As used in the present disclosure, the 2 elements may be regarded as being "connected" or "coupled" to each other using at least one of the one or more wires, cables, and printed electrical connections, and as non-limiting and non-inclusive examples, using the electromagnetic energy having wavelengths in the radio frequency region, the microwave region, and the light (both visible and invisible) region.

The reference signal may be abbreviated as RS (Reference Signal), and may be referred to as a pilot (pilot), depending on the applied standards.

As used in present disclosure, the expression "based on" does not mean "based solely on" unless otherwise indicated. In other words, the expression "based on" means both "based solely on" and "based at least on".

Any reference to an element using a designation such as "first", "second", or the like as used in the present disclosure does not generally limit the amount or order of the elements. These designations may be used in the present disclosure as a convenient way of distinguishing between 2 or more elements. Thus, references to the first and second elements do not imply that only two elements may be employed, or that the first element must in some way precede the second element.

The "means" in the configuration of each of the above devices may be replaced by "part", "circuit", "device", or the like.

When the terms "include (include)", "including (including)" and variations thereof are used in the present disclosure, these terms are intended to be comprehensive and similar to the term "comprising (comprising)". Moreover, the term "or (or)" as used in present disclosure is not intended to be an exclusive logical sum.

The wireless frame may be formed by 1 or more frames in the time domain. 1 or a plurality of frames in the time domain may be referred to as a subframe. The subframe may be further formed by 1 or more slots in the time domain. The subframe may be a fixed length of time (for example, 1 ms) independent of the numerology (numerology).

The numerology may be a communication parameter that is applied to at least one of the transmission and reception of a signal or channel. The numerology may indicate at least one of, for example, sub-carrier spacing (SCS: SubCarrier Spacing), bandwidth, symbol length, cyclic prefix length, transmission time interval (TTI: Transmission Time Interval), number of symbols per TTI, wireless frame configuration, a specific filtering process performed by the transceiver part in the frequency domain, and a specific windowing process performed by the transceiver part in the time domain.

The slot may be formed by one or a plurality of symbols (OFDM (Orthogonal Frequency Division Multiplexing) symbols, SC-FDMA (Single Carrier Frequency Division Multiple Access) symbols, or the like) in the time domain. The slot may be in units of time based on the numerology.

The slot may include a plurality of minislots. Each minislot may be formed by 1 or a plurality of symbols in the time domain. The minislot may also be referred to as a subslot. The minislots may be formed by a number of symbols fewer than the slot. The PDSCH (or PUSCH) transmitted in units of time greater than the minislot may be referred to as a PDSCH (or PUSCH) mapping type A. The PDSCH (or PUSCH) transmitted using the minislot may be referred to as a PDSCH (or PUSCH) mapping type B.

The wireless frame, subframe, slot, minislot, and symbol all represent units of time for transmitting the signal. The wireless frame, subframe, slot, minislot, and symbol may respectively be designated by other names.

For example, 1 subframe may be referred to as a transmission time interval (TTI: Transmission Time Interval), a plurality of consecutive subframes may be referred to as a TTI, and 1 slot or 1 minislot may be referred to as a TTI. That is, at least one of the subframe and the TTI may be a subframe (1 ms) of a conventional LTE, an interval shorter than 1 ms (for example, 1 to 13 symbols), or an interval longer than 1 ms. The unit representing the TTI may be referred to as the slot, the minislot, or the like, rather than the subframe.

The TTI refers, for example, to the minimum time unit of the scheduling in the wireless communication. For example, in the LTE system, the base station performs the scheduling of each terminal 20 to allocate the wireless resources (such as frequency bandwidth, transmission power, or the like that are usable in each terminal 20) in units of TTI. The definition of the TTI is not limited to such.

The TTI may be a unit of transmission time, such as a channel-encoded data packet (transport block), code block, code word, or the like, or may be a unit of processing, such as scheduling, link adaptation, or the like. When the TTI is provided, the time interval (for example, the number of symbols) during which the transport block, code block, code word, or the like is actually mapped, may be shorter than the TTI.

When 1 slot or 1 minislot is referred to as the TTI, 1 or more TTIs (that is, 1 or more slots or 1 or more minislots) may become the minimum time unit of scheduling. The number of slots (minislots) forming the minimum time unit of the scheduling may also be controlled.

The TTI having a time length of 1 ms may be referred to as a regular TTI (TTI in LTE Rel. 8-12), a normal TTI, a long TTI, a regular subframe, a normal subframe, a long subframe, a slot, or the like. The TTI that is shorter than the regular TTI may be referred to as a reduced TTI, a short TTI, a partial TTI (partial or fractional TTI), a reduced subframe, a short subframe, a minislot, a subslot, a slot, or the like.

The long TTI (for example, regular TTI, subframe, or the like) may be alternatively referred to as a TTI having a time length exceeding 1 ms, and the short TTI (for example, reduced TTI, or the like) may be alternatively referred to as a TTI having a TTI length less than the TTI length of the long TTI and a TTI length of 1 ms or greater.

The resource block (RB) is a resource allocation unit in the time domain and the frequency domain, and may include 1 or a plurality of consecutive sub-carriers (subcarriers) in the frequency domain. The number of sub-carriers included in the RB may be the same, regardless of the numerology, and may be 12, for example. The number of sub-carriers included in the RB may also be determined on the basis of numerology.

In addition, the time domain of the RB may include 1 or a plurality of symbols, and may have a length of 1 slot, 1 minislot, 1 subframe, or 1 TTI. 1 TTI, 1 subframe, or the like may each be formed by 1 or a plurality of resource blocks.

1 or a plurality of RBs may be referred to as physical resource blocks (PRBs: Physical RBs), sub-carrier groups (SCGs: Sub-Carrier Groups), resource element groups (REGs: Resource Element groups), PRB pairs, RB pairs, or the like.

In addition, the resource block may be formed by 1 or a plurality of resource elements (Res: Resource Elements). For example, 1 RE may be a wireless resource area of 1 sub-carrier and 1 symbol.

The bandwidth part (BWP: BandWidth Part, which may also be referred to as a partial bandwidth, or the like) may represent a subset of consecutive common RBs (common resource blocks) for a given numerology in a certain carrier. Here, the common RB may be identified by an index of the RB with reference to a common reference point of the carrier. A PRB is defined in a certain BWP, and may be numbered within that BWP.

The BWP may include a BWP for UL (UL BWP), and a BWP for DL (DL BWP). 1 or a plurality of BWPs may be configured in one carrier with respect to the terminal 20.

At least 1 of the configured BWPs may be active, and the terminal 20 need not expect to transmit and receive predetermined signals/channels outside the active BWP. The terms "cell", "carrier", or the like in present disclosure may be alternatively referred to as "BWP".

Structures of the wireless frame, subframe, slot, minislot, symbol, or the like described above are exemplary only. For example, the number of subframes included in the wireless frame, the number of slots per subframe or wireless frame, the number of minislots included in the slot, the number of symbols and RBs included in the slot or minislot, the number of sub-carriers included in the RB, the number of symbols in the TTI, the symbol length, the length of the cyclic prefix (CP: Cyclic Prefix), or the like may be variously modified.

In present disclosure, in cases where articles such as "a", "an", and "the" in English are added during translation, these articles may include indicating plural items of the noun that follows.

In present disclosure, the term "A and B are different" may mean "A and B are different from each other". Incidentally, the term may mean "A and B are different from C, respectively". Terms such as "separated", "combined", or the like may be interpreted similar to "different".

The examples/embodiments described in the present disclosure may be used by itself, in combination, or switched during implementation. Further, notification of predetermined information (for example, notification that "it is X") is not limited to notifications performed explicitly, and may include notifications performed implicitly (for example, not notifying the predetermined information).

Incidentally, the HARQ response in this disclosure is an example of the response associated with the retransmission control. The PSCCH/PSSCH is an example of the data. The PSFCH is an example of the channel used for the transmission and reception of the response associated with the retransmission control. u is an example of the first parameter. v is an example of the second parameter. $f_{gh}$ is an example of the third parameter. $f_{SS}$ is an example of the fourth parameter.

The present disclosure is described above in detail, however, it may be apparent to those skilled in the art that the present disclosure is not limited to the embodiments described in the present disclosure. Various variations and modifications may be made without departing from the scope of the present disclosure determined by recitations of the claims. The description in the present disclosure is exemplary, and the description in no way limits the scope of the present disclosure.

DESCRIPTION OF THE REFERENCE
NUMERALS

10 Base station
110 Transmitting unit

120 Receiving unit
130 Setting unit
140 Control unit
20 Terminal
210 Transmitting unit
220 Receiving unit
230 Setting unit
240 Control unit
1001 Processor
1002 Storage device
1003 Auxiliary storage device
1004 Communication device
1005 Input device
1006 Output device

The invention claimed is:

1. A terminal comprising:
a receiver configured to receive configuration information by a higher layer signaling from a base station;
a processor configured to set:
   a parameter which determines a sequence group that is applied to a response associated with a retransmission control in terminal-to-terminal communication, based on the configuration information, or
   a fixed value; and
a transmitter configured to transmit the response in response to data received from another terminal to the another terminal,
wherein when an operation of transmitting the response to the another terminal is a feedback operation of transmitting only a NACK, a cyclic shift corresponding to an ACK is not defined, and the processor is configured to determine a cyclic shift corresponding to the NACK based on a layer 1 source ID of the another terminal, and
wherein, in a situation where the receiver receives multiple retransmissions of the data, the transmitter does not transmit the response to the another terminal.

2. The terminal as claimed in claim 1, wherein
the processor generates a sequence of the response, based on the determined sequence group, and
the transmitter transmits the response to the another terminal by applying, to the sequence, the cyclic shift in accordance with the response in response to the data received from the another terminal.

3. The terminal as claimed in claim 1, wherein the processor sets a value of the fixed value to be 0.

4. A communication method of a terminal, comprising:
receiving configuration information by a higher layer from a base station;
setting:
   a parameter which determines a sequence group that is applied to a response associated with a retransmission control in terminal-to-terminal communication, based on the configuration information, or
   a fixed value; and
transmitting the response in response to data received from another terminal to the another terminal,
wherein when an operation of transmitting the response to the another terminal is a feedback operation of transmitting only a NACK, a cyclic shift corresponding to an ACK is not defined, and a cyclic shift corresponding to the NACK is determined based on a layer 1 source ID of the another terminal, and
wherein, in a situation where the terminal receives multiple retransmissions of the data, the terminal does not transmit the response to the another terminal.

5. A communication system comprising: a base station; and a terminal, wherein the base station includes a transmitter configured to transmit configuration information by a higher layer signaling to the terminal, and the terminal includes:

a receiver configured to receive the configuration information from the base station;

a processor configured to set:

a parameter which determines a sequence group that is applied to a response associated with a retransmission control in terminal-to-terminal communication, based on the configuration information, or a fixed value; and a transmitter configured to transmit the response in response to data received from another terminal to the another terminal, wherein when an operation of transmitting the response to the another terminal is a feedback operation of transmitting only a NACK, a cyclic shift corresponding to an ACK is not defined, and the processor is configured to determine a cyclic shift corresponding to the NACK based on a layer 1 source ID of the another terminal, and wherein, in a situation where the receiver receives multiple retransmissions of the data, the transmitter does not transmit the response to the another terminal.

* * * * *